United States Patent [19]

Bousseau et al.

[11] 4,425,751
[45] Jan. 17, 1984

[54] AUTOMATIC ASPARAGUS PICKING MACHINE

[75] Inventors: Gérard Bousseau, Talence; Pierre Baylou, Bordeaux; André Mora, Gradignan; Michel Monsion, Carignan-Latresne; Christian Bouvet, Canejan, all of France

[73] Assignee: Ecole Nationale Superieure d'Electricite et de Radioelectricite de Bordeaux (E.N.S.E.R.B.) U.E.R. Dérogatoire de l'Université de Bordeaux, Talence, France

[21] Appl. No.: 328,530

[22] Filed: Dec. 8, 1981

[30] Foreign Application Priority Data

Sep. 12, 1981 [FR] France .................. 80 26502

[51] Int. Cl.³ .................. A01D 45/00; A01D 69/00
[52] U.S. Cl. .................. 56/327 A; 56/10.2
[58] Field of Search ............ 56/10.2, 327 A, 327 R, 56/10.4, 10.5, DIG. 15

[56] References Cited

U.S. PATENT DOCUMENTS

| 3,636,687 | 1/1972 | McKissick et al. | 56/DIG. 15 |
| 4,003,193 | 1/1977 | Haws | 56/327 A |
| 4,064,682 | 12/1977 | Haws | 56/327 A |
| 4,094,238 | 6/1978 | Striplin | 99/643 |

FOREIGN PATENT DOCUMENTS

| 6814542 | of 0000 | Netherlands . | |
| 7711510 | 10/1977 | Netherlands . | |
| 683662 | 9/1979 | U.S.S.R. | 56/10.2 |

Primary Examiner—Gene Mancene
Assistant Examiner—John Weiss
Attorney, Agent, or Firm—Schwartz, Jeffery, Schwaab, Mack, Blumenthal & Koch

[57] ABSTRACT

An automatic asparagus picking machine is disclosed comprising a chassis movable along a mound in which the asparagus are grown. The chassis has a picking tool which is mounted for horizontal and vertical translation at right angles to the direction of displacement of the chassis. The tops of the asparagus are back lit by a lighting system on one side of the mound and their images are picked up by a camera system on the other side. A microprocessor controls the direction of displacement of the chassis parallel to the mound and controls the horizontal and vertical translation of the picking tool. In one embodiment, there is one camera and the microprocessor has a window generator generating windows in two zones of the field of view of the camera. In another embodiment, juxtaposed wide angle and narrow angle cameras are used. Electric motors drive each of two front wheels at different speeds to control the direction of displacement of the machine.

13 Claims, 13 Drawing Figures

AUTOMATIC ASPARAGUS PICKING MACHINE

FIELD OF THE INVENTION

The present invention relates to an automatic asparagus picking machine or robot, that is, a self-propelled apparatus capable of detecting asparagus breaking through the ground and automatically picking it without any human intervention.

BACKGROUND OF THE INVENTION

At the present time, in the field of agriculture certain picking or gathering tasks, for example, harvesting grains (wheat, corn, etc.) fodder and grapes have been satisfactorily mechanized. For other operations such as trimming vines and fruit trees and packing fruit, the problem has yet to be solved.

Increasing productivity and competitiveness involves a development of mechanization. Such mechanization is all the more necessary and inescapable inasmuch as it is increasingly difficult year after to year to find seasonal or migrant labor for picking and harvesting crops.

This type of problem is posed particularly for the picking of asparagus which is a relatively arduous task for which the remuneration cannot be correspondlingly great if the cost price or the asparagus crop is not to be unduly increased and asparagus crop unsalable or uncompetitive.

OBJECT AND SUMMARY OF THE INVENTION

An object of the present invention is to find a solution to such a problem by providing a fully automatic agricultural machine capable of taking the place of manual labor for picking asparagus with better productivity and at a reasonable cost.

According to the invention there is provided an automatic asparagus picking machine of the type comprising means for displacing and controlling the direction of displacement of the chassis parallel to a mound of soil in which asparagus to be picked are grown. An asparagus picking tool is provided with means mounting the picking tool for horizontal and vertical translation at right angles to the direction of displacement of the chassis. Direction and control means detect asparagus to be picked and control the position of the picking tool. The direction and control means comprises a camera system and a lighting system for back lighting the mound of soil. The camera and lighting systems are mounted on the chassis on opposite sides of the mound and arranged substantially in a horizontal plane generally coinciding with the top of the mound. The means for displacing and controlling the displacement of the chassis includes a microprocessor for controlling the direction of displacement of the chassis parallel to the mound. The microprocessor also controls the horizontal and vertical translation of the picking tool for extracting a detected asparagus from the mound and transferring its to a receptacle.

According to a first embodiment, the camera system comprises a single camera. The microprocessor detects the presence and passage of an asparagus image picked up by the camera. The microprocessor determines spatial coordinates of the asparagus and supplies coordinate related signals to the motor means for displacement of the chassis and to motor means for the horizontal and vertical translation of the picking tool to stop movement of the machine with the picking tool in vertical alignment with the asparagus. The microprocessor thereafter commands the picking tool to pick the asparagus and then restart displacement of the chassis at a predetermined speed.

Preferably the microprocessor comprises a sync pulse generator connected to the camera. A first and a second detection window generator means generate windows in two zones of the field of view of the camera. A first and a second detection means detect the presence of the asparagus image in the respective windows. The first and second detection means respectively connect the first and second window generator means to the camera via a circuit for shaping and processing the image picked up by the camera. The microprocessor further comprises a circuit for calculating the displacement of the chassis receiving output signals from the detection means. The calculating circuit controls the motor means for displacement of the chassis and is connected by a horizontal and vertical coordinate calculating circuit and a circuit for controlling the motor means for horizontal and vertical translation of the picking tool to the motor means for horizontal and vertical translation of the picking tool.

According to a second embodiment, the camera system comprises two juxtaposed cameras. A first camera is a wide angle camera with low remanence and the second camera is a narrow angle camera. The microprocessor detects the entrance of the asparagus in the field of view of the first camera, and thereafter its passage into the viewing axis of the second camera while the asparagus is still in the field of view of the first camera. The microprocessor controls the position of the chassis so that the asparagus is in the viewing axis of the second camera and determines spatial coordinates of the asparagus for delivering coordinate related signals to the motor means for horizontal and vertical translation of the picking tool and for starting the machine for displacement at a predetermined speed after extracting the asparagus.

Such a mircoprocessor comprises a circuit for calculating the displacement of the chassis connected to each of the camera through a circuit for shaping and processing images picked up by the associated camera. The calculating circuit controlling the motor means for the displacement of the chassis and connected by a circuit for calculating horizontal and vertical coordinates of the asparagus and a circuit for controlling the motor means for horizontal and vertical translation of the picking tool.

These and other features and advantages of the essential parts of the automatic picking machine embodying the invention and in particular the camera systems and the above defined associated microprocessor will become more apparent from the description which follows, given solely by way of example with respect to the accompanying drawings.

DETAILED DESCRIPTION OF THE PREFERRED EMBODIMENTS

Figure 1:
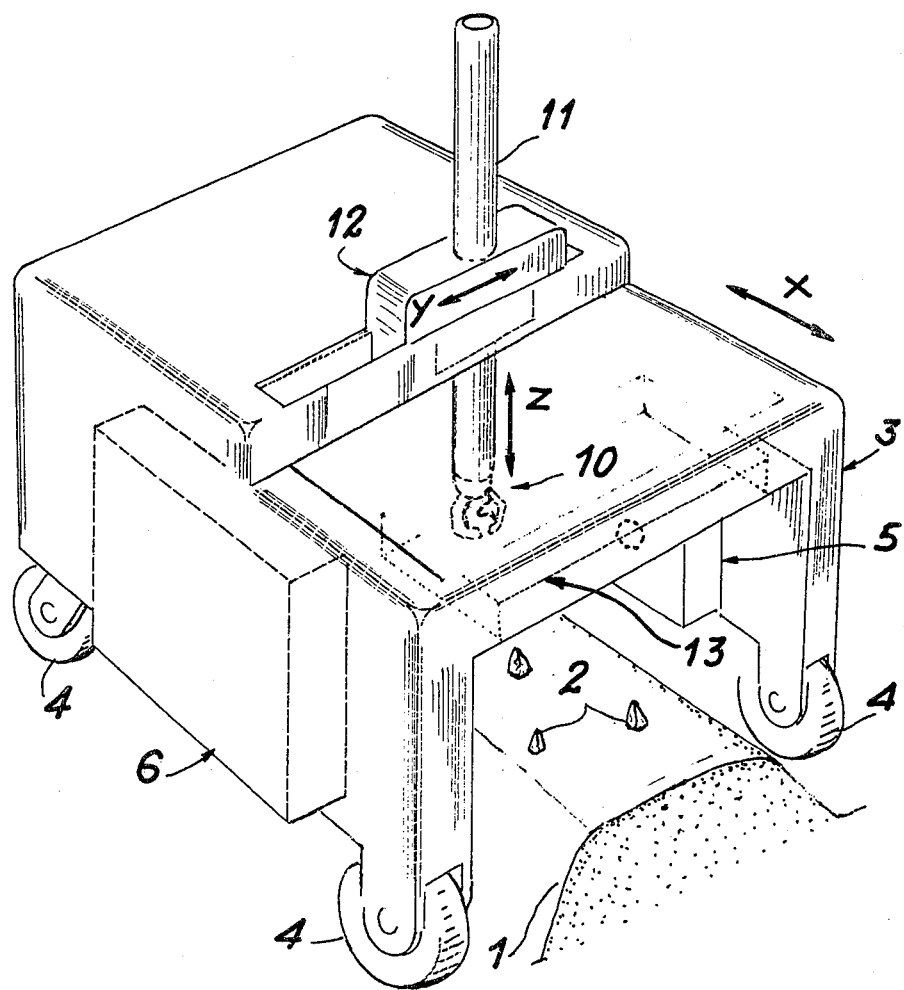
FIG. 1 is a diagrammatic perspective view of an automatic asparagus picking machine straddling a mound in which a row of asparagus is planted.

FIG. 1 is a highly schematic view of a prototype of the automatic machine or robot for picking asparagus according to the invention.

The machine comprises a movable unit adapted to be displaced straddling a mound 1 for moving a row of asparagus, several tips or turions 2 extending through surface of the soil at the top of the mound 1.

In the embodiment illustrated in FIG. 1, the movable unit comprises a straddling chassis 3 having four wheels 4, of which two for example (at the front or back of the machine) are motor driven by one or two motors (not shown) aboard the chassis. The or each motor may be an electric motor with the source of electric energy therefor mounted on the chassis 3 of the machine.

On one of the sides of the chassis 3 is mounted a camera system 5 and on the other side opposite the camera system 5 is mounted a back lighting system 6. The camera system 5 and the lighting system 6 are on opposite sides of the mound 1 substantially in alignment with the top of the mound.

Figure 2:
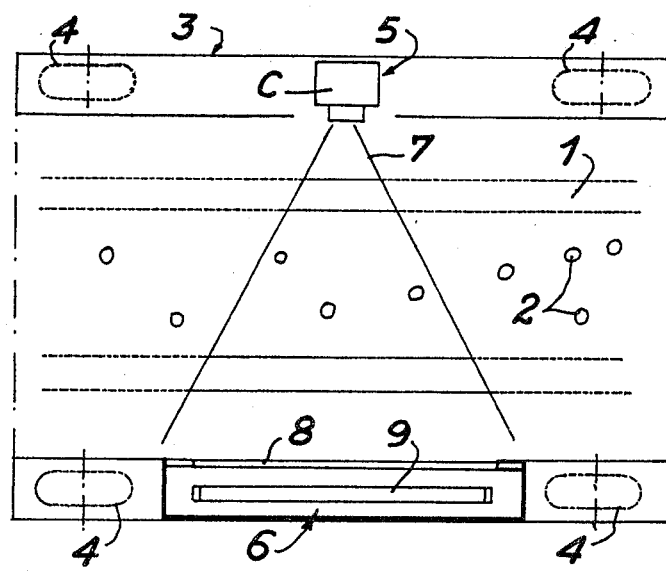
FIG. 2 is a diagrammatic top plan view of the caamera system and back lighting system on opposite sides of the asparagus mound being monitored.
Figure 3:
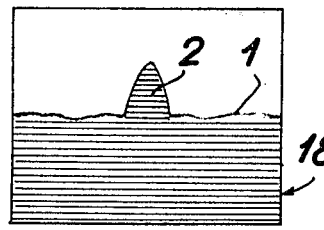
FIG. 3 is a diagrammatic representation of an image of asparagus picked up by a camera on the machine.
Figure 5:
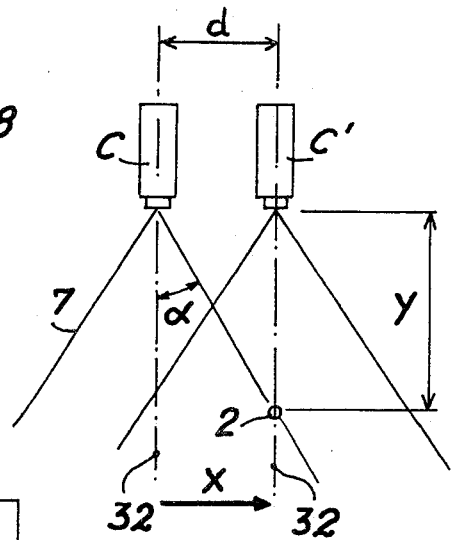
FIG. 5 is a representative showing of the manner of calculating the spatial coordinates of a detected asparagus.
Figure 6:
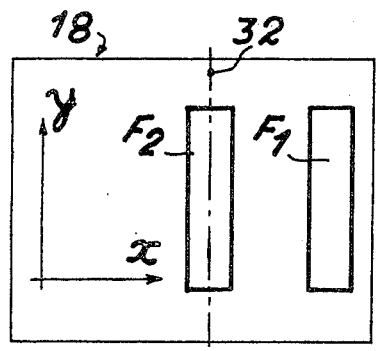
FIG. 6 illustrates the location of the two detection windows in the field of view of the camera of the system of FIG. 4.

According to a first embodiment, the camera system 5 comprises a single camera C having a field of view schematically illustrated in 7 in FIGS. 2 and 5. The field of view of the camera covers substantially the entire surface of a translucid screen lit 8 by a lamp or tube 9 enclosed in a light box.

The picking machine further comprises means for grasping an asparagus or an asparagus picking tool for example, vertically oriented tongs schematically shown at 10. The tongs are fixed at the end of a vertical gear rack 11 movable along the vertical axis Z by means of an electric motor carried on the carriage 12 supporting the tongs 10.

The carriage 12 is mounted for translation in a Y direction at right angles to the Z direction and to the direction of displacement of the machine which is of course parallel to the axis of the mound 1. To this end the carriage 12 may, for example, be driven by means of one or two horizontal worms parallel to axis Y, carried by the chassis 3 and rotationally driven by an electric motor, the carriage 12 being fixed to a nut cooperating with the worm. The drive and guide means for the gear rack 11 and the carriage 12 are entirely conventional and therefore need not be described or illustrated in greater detail herein.

As for the tongs 10, they may comprise two opposed legs or jaws displaceable relative to each other, under the action of motor means such as an electromagnet, for grasping the asparagus and extracting it from the soil and then depositing it in a receptacle 13 carried on the machine.

The motors for controlling the forward displacement of the machine (direction X), the horizontal direction (direction Y) of the tongs 10 and the vertical displacement (direction Z) of the tongs 10 and the operation of the tongs 10 are controlled automatically by means of signals received from the camera C and processed in a microprocessor which will now be described with reference to FIGS. 3–6, and more particularly, to FIG. 4.

Figure 4:
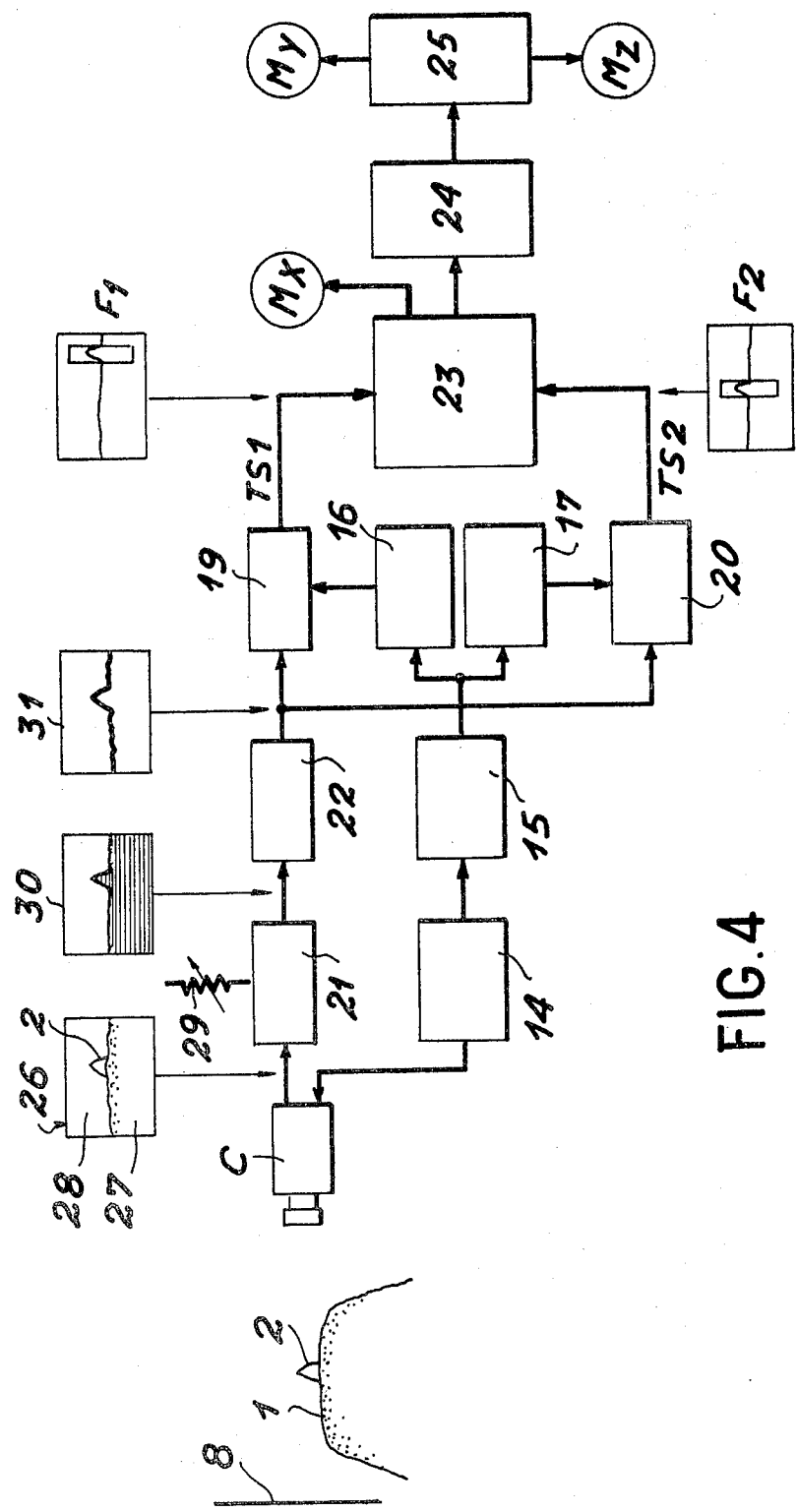
FIG. 4 is a block diagram for the means for detecting the presence of asparagus.
Figure 7:
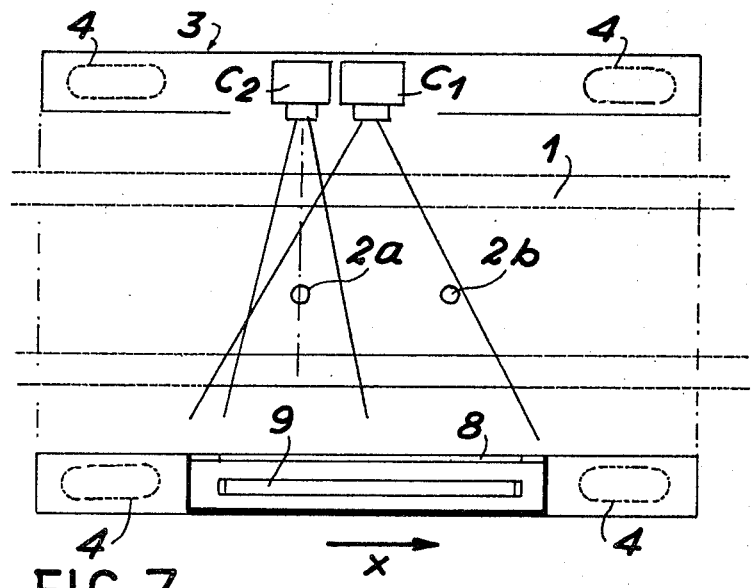
FIG. 7 illustrates an alternative embodiment of the detection means utilizing two cameras.
Figure 8:
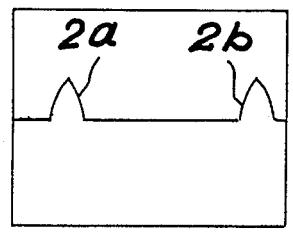
FIGS. 8 and 9 illustrate imges in the field of view of each of the two cameras in FIG. 7.
Figure 9:
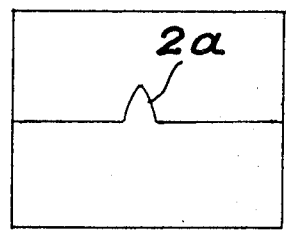
Figure 10:
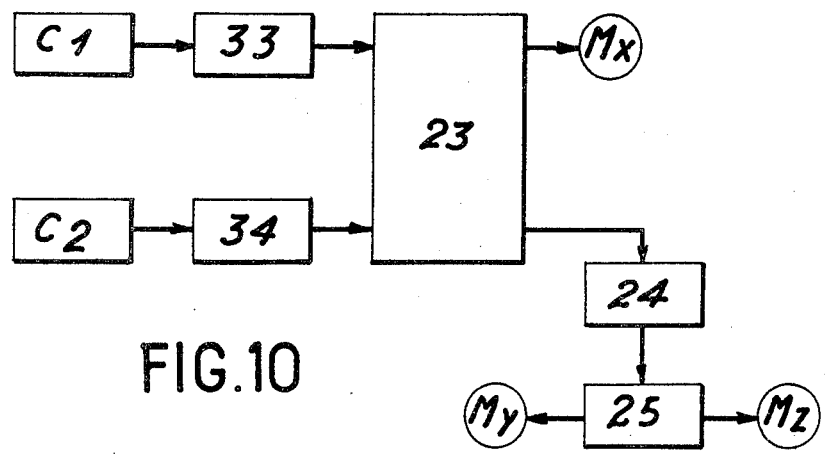
FIG. 10 is a highly schematic block diagram for detection means with two cameras.

In FIG. 4 the light screen is symbolized at 8. The microprocessor for processing information picked up by the camera C comprises a sync pulse generator or clock 14 connected to the camera C.

The sync pulse generator 14 is also connected via a coordinate calculating circuit 15 to two detection window generators 16 and 17. One of these generators 16 delimits the contour of a first window F1 located in a first zone of the field of view of the camera C diagrammatically shown by a rectangle 18 in FIG. 6, whereas the second window generator 17 delimits a second window F2 identical to the first but located in a second zone of the field of view. Each of the windows generators 16,17 are connected to detection means 19,20 for detecting the presence of an asparagus.

The detection means 19 and 20 are connected in parallel to the camera C by means of a circuit for shaping and processing the images comprising a "binarizing" circuit 21 and a contour extracting circuit 22. The outputs of detection means 19 and 20 are delivered to a circuit 23 for calculating the displacement of the machine controlling, on the one hand, the motor Mx for displacement of the machine and, on the other hand, motors My and Mz for horizontal and vertical translation of the tongs 10 by means of a circuit 24 for calculating the coordinates (in direction Y and Z) of the asparagus detected and a circuit 25 for controlling motors My and Mz.

Power supply for the various circuits is provided by an electric power source aboard the machine; likewise the entire microprocessor is mounted on the chassis 3.

The operation of the above described microprocessor is as follows.

The camera C and the lighting screen 8 providing back lighting, are arranged so that the camera C picks up in its field of view (FIG. 3) the top of the mound substantially along a horizontal center line. The interest of back lighting resides in the machine not being dependent on ambient lighting conditions and therefore can operate day or night. The images are at all times satisfactorily contrasted.

When the turion of an asparagus 2 is in the field of view of the camera C, the image 26 picked up by the camera (see FIG. 4) distinguishes a dark lower part 27 and a light upper part 28 and the turion 2.

Owing to the "binarizing" circuit 21 with adjustable threshold means 29, the image 26 is transformed into an only black and white image. The contour extracting circuit 22 (image 31) constructs the contour or profile of the top of the mound 1 from the black and white boundary of the black and white image 30. This image 31 is analysed by detection means 19 and 20.

The sync pulse generator 14 permits calculation at 15 of the X and Y coordinates (FIG. 6) of the points in the field 18 of view of the camera C covered and also generates control synchronizing bleeps or signals for the camera.

The detection means 19 only takes into account the part of the image 31 facing window F1 generated by generator 16 and detection means 20 does just the same with regard to window F2, the sizes and locations of the windows F1 and F2 in the field of view of the camera being defined by circuit 15. Window F1 is positioned at the boundary of the field of view 18 on the side from which projects the image of the turion 2 when the moving machine (direction X in FIG. 5) comes into position opposite the asparagus.

In FIG. 5 is represented the position C of the camera when the image of the turion 2 coming into the field of view of the camera will be in window F1. Window F2 is positioned in the vertical plane of symmetry 32 of the field of view. At C' in FIG. 5 is the position of the camera when the image of the turion arrives in plane 32 where the window F2 is located. The passage of the image of the turion into the window F1 causes a signal TS1 to be generated by detection means 19 and the passage of the same image into window F2 causes a signal TS2 to be generated by detection means 20.

By means of signals TS1 and TS2 circuit 23 calculates the distance d between positions C and C' of the camera taking into account the speed of displacement of the machine. Circuit 24 calculates the Y coordinate of the turion 2 from the distance d since $Y = d \cdot tg\alpha$ where $\alpha$ is the half angle of the camera field.

Circuit 23 controls the stopping of motor Mx controlling the displacement of the chassis whereas circuit 25 controls the Y translation of carriage 12 in order to bring the tongs 10 into vertical alignment with the turion, then translation in the Z direction of the tongs 10 to reach the turion.

The adjustment of the control of motor Mx is obviously determined so that the machine stops with the tongs 10 in the vertical plane YZ passing substantially through the middle of the turion. The length of the downward travel of the tongs 10 in the Z direction, although adjustable, is set beforehand and is not subsequently modified by the machine itself.

Of course, the microprocessor also controls the restarting of the machine when the asparagus has been picked up and its speed of forward displacement is preselected.

Limit switches associates with the gear rack 11 ensure the actuation of the tongs 10 in its lowered position to grasp the asparagus after penetrating a predetermined depth into the soil around the asparagus, in its raised position for releasing the picked asparagus to fall by gravity into the receptacle 13, for example, through a rectractable chute (not shown) along a path extending away from the path of movement of the tongs.

The microprocessor may be programmed to taken into account only turions of a predetermined minimum size and, optionally to select asparagus by size by suitable filtering the images received by the detection means 19 and 20, this preselection of the images controlling the dispatching of the picked asparagus into separate compartments of the receptacle 13 as a function of their size.

The machine thus self-propelled, self-contained and entirely automatic for systematic picking of all asparagus it encounters in its field of view along the entire mound.

To this end, an automatic directional control system for displacement along the mound, and optionally, at the end of the mound, means for bringing the machine automatically into alignment with the next mound without any external manual intervention. Automatic directional control may be effected, for example, by detecting the flanks of the mounds by feelers or ultrasounds.

Figure 11:
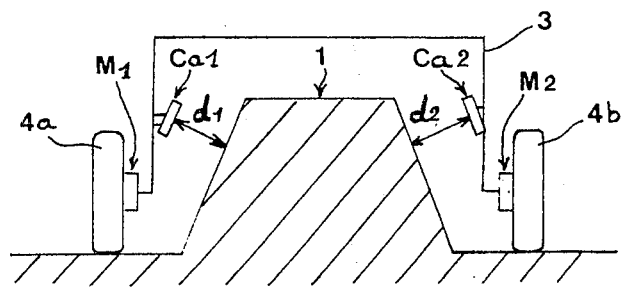
FIG. 11 is a diagrammatic cross-sectional view showing the location of directional control sensors for the chassis running along an asparagus mound.
Figure 12:
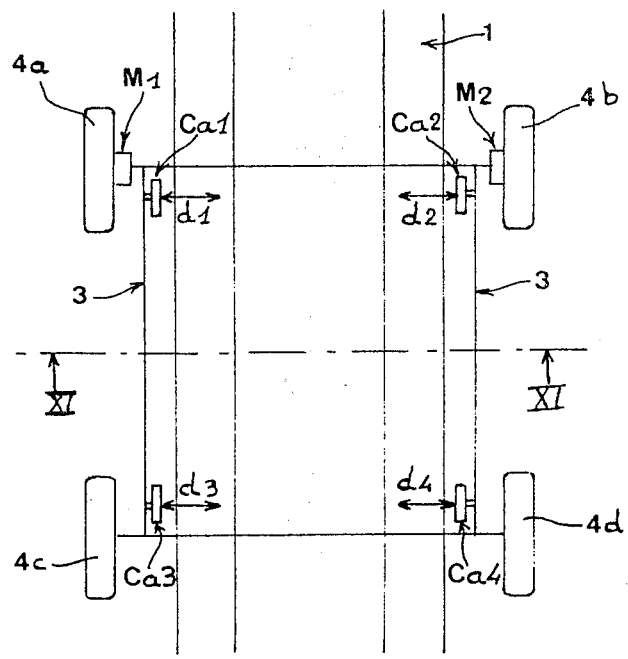
FIG. 12 shows a diagrammatic top plan view of the arrangement in FIG. 11.
Figure 13:
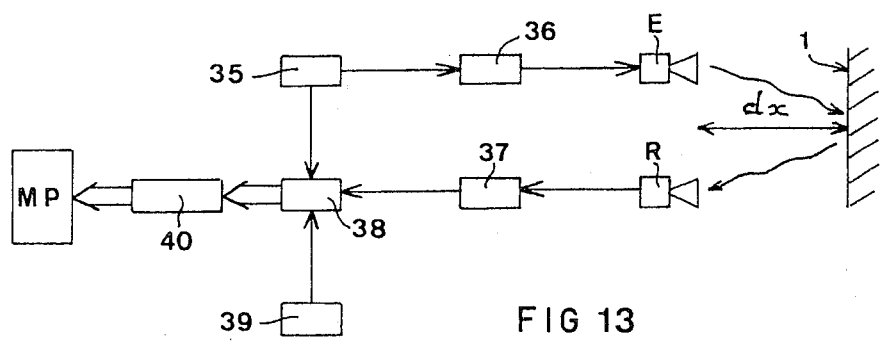
FIG. 13 is a block diagram showing the operation of the directionnal control illustrated in FIGS. 11 and 12.

The automatic ultrasonic directional control system is schematically illustrated in FIGS. 11 and 12 and a functional block diagram is represented in FIG. 13.

In FIGS. 11 and 12, the chassis of the machine is designated by reference 3 and is carried on four non-steering wheels 4a,4b,4c and 4d, the front wheels 4a, 4b being driven independently of each other by means of an electric motor M1,M2 incorporated at each wheel hub. The rear wheels 4c, 4d are not driven. The orientation of the machine is ensured by motors M1, M2 having different speeds of rotation.

In the embodiment of FIGS. 11 and 12, there are four ultrasonic sensors or probes (Ca1 to Ca 4) each comprising a transmitter and a receiver. The four sensors are mounted on the chassis 3 in line with the four wheels facing the flanks of the mound 1. The sensors Ca1 to Ca 4 are respectively at distances d1,d2, d3 and d4 from the flanks of the mound, which distances are equal to one another when the machine is properly positioned relative to the mound.

FIG. 13 illustrates the operation of the sensors. Each sensor Ca1 to Ca 4 comprises an ultrasonic transmitter E controlled by a pulse generator 35 through an amplifier 36. The transmitter E is at a certain distance dx from the flank of the mound 1. The ultrasonic wave emitted by the transmitter is reflected off the mound toward the receiver R at the same distance dx. The receiver R delivers to amplifier 37 a signal of the same frequency as that produced by generator 35 for transmitter E. The signal is supplied to a counter 38 which is also connected to the generator 35 and to a clock 39. Finally, the counter 38 is connected by an interface circuit 40 to the microprocessor MP of the machine.

Such an arrangement for measuring the trajectory time of an ultrasonic pulse is well known and need not be described in detail.

The period of time T between the pulse train transmitted by transmitter E and the pulse train received by receiver R is $T = 2dx/C$, C being the speed of sound through air. The period of time T is numerically converted by means of counter 38 counting pulses delivered by clock 39 from the moment of transmission to the moment the echo wave train is received. The transmission frequency is of the order of 40 Hz which may be modified if there is no echo or if it is not usable.

The contents of the counter is "read" by the microprocessor which is capable of translating these contents into a sensor/reflected surface distance.

As distances d1,d2,d3 and d4 are stored in the microprocessor, it can determine the speeds of rotation of motors M1 and M2 in order to keep the machine in its corrects position relative to the mound 1.

The speeds of rotation of motors M1 and M2 are translated into speeds of displacement V1 and V2 of the front wheels 4a, 4b of the machine. These displacement speeds V1 and V2 are in the vicinity of the so-called cruising speed Vo of the machine.

The correction of the displacement speeds relative to the cruising speed Vo is carried out, taking into account the measurement of distances d1,d2,d3 and d4 according to the following algorithm:

ΔV = speed of motor M1—speed of motor
M2 = $a(d1-d3) + b(d3-d4)$

Coefficients a and b are determined (sign and value) as a function of the dimensions of the machine, cruising speed Vo and desired machine reaction speed. The above algorithm may be of different form and make bring into play limits to preclude each of distances d1, d2, d3 and d4 falling below a minimum safety value below which the machine would hit the mound 1.

There may be more or less sensors and they may be positioned in different ways on the machine.

They may all be positioned at the front of the machine and there may be as few as two sensors.

In order to eliminate some sensor operating problems when the distance from the mound is too small, the sensors may be supplied sequentially or operate at different frequencies. Furthermore, distance measurements may be filtered by the microprocessor of the machine to eliminate any spurious values. Finally, if is possible to use the ultrasonic sensors continuously and not by pulses as described above. It would then be a matter of amplitude modulation of the ultrasonic wave by a signal dephased between transmission and reception.

The end of the mound 1 is detected by the absence of any echoes picked up by the receivers.

The microprocessor on the machine is programmed to produce motor M1 and M2 control signals such that the machine follows a semicircular path having a radius R = D/2 where D is the intermound spacing, so that the machine reaches the correct position at the end of the following mound and resumes normal operation.

Errors in displacement or shifting due to sliding of the machine or any defects in the control are permitted within the limits of acceptable mechanical tolerance relative to the widths of the mounds. However, in order to improve accuracy in displacement from one mound to the next, the machine may be equipped with an absolute position sensor. For example, a magnetic compass may be useful for determining the angle between the axis of the machine and the magnetic north. The 180° turn of the machine at one end of a mound to the next mound may therefore be made possible by the microprocessor.

FIGS. 7–10 illustrate a second embodiment of the asparagus detection means. In this embodiment the camera system 5 comprises two juxtaposed cameras C1 and C2 (the first relative to the direction X of the forward displacement of the machine) is a wide angle camera having low remanence so as to obtain satisfactory images with high speeds of displacement (of the order of 1 m/s). Camera C2 has a narrower field of view. Cameras C1 and C2 are connected to a circuit 23 for calculating the displacement of the machine controlling motor Mx and motors My and Mz of the picking tool or grasping means by means of circuits 24 and 25, said circuits 23, 24 and 25 being similar to those of FIG. 4. The circuits 33 and 34 interposed between the cameras C1 and C2 and the circuit 23 fulfill the same functions as circuits 21 and 22 of FIG. 4. Circuits 33 and 34 each include a "binarizing" circuit followed by a contour extraction circuit. The operation of circuits 33 and 34 will not be described as it is strictly the same as that of circuits 21 and 22 described above. The microprocessor of FIG. 10 processes in real time the images form cameras C1 and C2 and calculates the coordinates of the different turions in the common field of view of the cameras (stereoscopic vision).

The wide angle first camera C1 permits detection of the presence of an asparagus when a turion enters its field of view (position 2b in FIG. 8) and from that moment starts the deceleration of the machine in order that the turion enters the field of view of camera C2 at a low rate of speed. Then, when the asparagus is on the axis of camera C2 (position 2a in FIG. 9) the machine is brought to a halt immediately.

If the image of the asparagus turion is not correctly situated at the middle of the image produced by camera C2, the machine may be controlled to move to the precise centered position.

Once the correct position of the turion on the image furnished by the camera C2 is attained, the position of the image of the asparagus turion furnished by the camera C1 permits the determination of the coordinates of the turion (stereoscopic viewing) by a simple calculation. Circuits 24 and 25 then produce the control orders for the motors My and Mz displacing the tool 10 which is then on the axis of the camera C2 whose narrow field of view permits accurate location of the turion.

Moreover, in the second embodiment as in the first, it is possible to detect the presence of more than one asparagus next to one another in the field of view of the camera by storage of the detection signals.

Of course, the invention is not limited to the illustrated and described embodiments but on the contrary is intended to cover all modifications and alternatives not only as regards the microprocessor unit itself but also with respect to the various mechanical parts of the machine, its propulsion means, its directional control system and the picking tools, as well as the arrangement and operation thereof, without departing from the scope of the invention.

What we claim is:

1. An automatic asparagus picking machine comprising a movable chassis, means for displacing and controlling the direction of displacement of said chassis parallel to a mound of soil in which asparagus to be picked are grown, an asparagus picking tool, means mounting said asparagus picking tool for horizontal and vertical translation at right angles to the direction of displacement of said chassis, detection and control means for detecting asparagus to be picked and controlling the position of said picking tool, the improvement wherein said detection and control means comprises a camera system and a lighting system for back lighting the mound of soil, said camera and lighting systems being mounted on said chassis so as to be on opposite sides of the mound and arranged substantially in a horizontal plane adapted to coincide with the top of the mound, said means for displacing and controlling the displacement of said chassis including microprocessor means for controlling the direction of displacement of said chassis parallel to the mound, motor means for horizontal and vertical translation of said picking tool, said microprocessor means also controlling the horizontal and vertical translation of said picking tool for extracting a detected asparagus from the mound and transferring it to a receptacle.

2. The picking machine of claim 1, said means for displacing and controlling the direction of displacement of said chassis also including motor means for displacement of said chassis, wherein said camera system comprises a single camera, said microprocessor means detecting the presence and passage of an asparagus image picked up by said camera, said microprocessor means determining spatial coordinates of the asparagus and supplying coordinate related signals to said motor means for displacement of said chassis and to said motor means for the horizontal and vertical translation of said picking tool to stop movement of said machine with the picking tool in vertical alignment with the asparagus, said microprocessor means thereafter commanding said picking tool to pick the asparagus and then restarting displacement of said chassis at a predetermined speed.

3. The picking machine of claim 2, wherein said microprocessor means comprises a sync pulse generator means connected to said camera, a first and a second detection window generator means generating windows in two zones of the field of view of said camera, a first and a second detection means for detecting the presence of the asparagus image in a respective one of said windows, said first and second detection means being connected recpectively to said first and second window generator means and to said camera via a circuit for shaping and processing the image picked up by the said camera, said microprocessor means further comprising a circuit for calculating the displacement of said chassis receiving output signals from said detection means, said calculating circuit controlling said motor means for displacement of said chassis and connected by a horizontal and vertical coordinate calculating circuit and a circuit for controlling said motor means for horizontal and vertical translation of said picking tool to said motor means for horizontal and vertical translation of said picking tool.

4. The picking machine of claim 3, wherein said first window generated is positioned along the forward end of the field of view of said camera relative to displacement of said chassis, said second window generated being positioned in a vertical axial plane of the field of view, and a calculating circuit responsive to said sync pulse generator means defining the coordinates of said windows.

5. The picking machine of claim 1, wherein said camera system comprises two juxtaposed cameras, a first of said cameras being a wide angle camera with low remanence and a second of said cameras being a narrow angle camera, said microprocessor means detecting the entrance of the asparagus in the field of view of said first camera, and thereafter its passage into the viewing axis of said second camera while the asparagus is still in the field of view of said first camera, said microprocessor means controlling the position of said chassis so that the asparagus is in the viewing axis of said second camera and determining spatial coordinates of the asparagus for delivering coordinates related signals to said motor means for horizontal and vertical translation of said picking tool and for starting said machine again for displacement at a predetermined speed extracting the asparagus.

6. The picking machine of claim 5, wherein said microprocessor means comprises a circuit for calculating the displacement of said chassis connected to each of said cameras through a circuit for shaping and processing image picked up by the associated camera, said calculating circuit controlling said motor means for the displacement of said chassis and connected by a circuit for calculating horizontal and vertical coordinates of the asparagus and a circuit for controlling said motor means for horizontal and vertical translation of said picking tool.

7. The picking machine of claim 1, wherein said motor means for horizontal and vertical translation of said picking tool comprises a vertical gear rack, said picking tool being fixed to a lower end of said gear rack, said picking tool and gear rack being mounted on a carriage movable in a plane perpendicular to the direction of displacement of said chassis.

8. The picking machine of claim 1, wherein said lighting system comprises a translucid screen arranged perpendicular to the axis of said camera system, and lighting means disposed behind said screen.

9. The picking machine of claim 1 wherein said motor means for displacement of said chassis comprises two electric motors, each of said electric motor driving one of a pair of wheels of said machine, directional control means being provided comprising two ultrasonic sensing means arranged on opposite sides of said machine and each being adapted to face one of the flanks of the mound along which said machine is being displaced, said sensing means measuring their distances from the flanks of the mound, said sensing means being connected to said microprocessor means for controlling the respective speeds of said electric motors for keeping said machine in correct alignment along the mound.

10. The picking machine of claim 9, said machine having four wheels and said pair of wheels being front wheels, herein said sensing means comprise four ultrasonic sensors arranged substantially in alignment with the respective wheels of said machine.

11. The picking machine of claim 1, further comprising means for determining the orientation of said machine relative to the axis of mound, said means for determining the orientation of said machine being connected to said microprocessor means for controlling the turning of said machine approximately 180° from the end of the mound into alignment with the corresponding end of an adjacent mound.

12. The picking machine of claim 11, wherein said means for determining the orientation of said machine comprises a magnetic compass.

13. The picking machine of claim 1, wherein said machine is self-propelled and self-contained.

* * * * *